US006149036A

United States Patent [19]

Serio

[11] Patent Number: 6,149,036

[45] Date of Patent: Nov. 21, 2000

[54] DISPENSING PUMP WITH AUTOMATIC SHUT-OFF AND METHOD OF MANUFACTURING

[76] Inventor: Donald L. Serio, 814 N. Grand Ave., Glendora, Calif. 91741

[21] Appl. No.: 09/309,184

[22] Filed: May 10, 1999

[51] Int. Cl.[7] .......... G01F 11/30

[52] U.S. Cl. .......... 222/321.9; 222/380; 222/385

[58] Field of Search .......... 222/321, 321.7, 222/321.8, 321.9, 384, 385, 380

[56] References Cited

U.S. PATENT DOCUMENTS

| | | | |
|---|---|---|---|
| 2,772,116 | 11/1956 | Dobkin | 222/321.7 X |
| 3,779,669 | 12/1973 | Sommer | 417/214 |
| 4,155,489 | 5/1979 | Steiman | 222/321 |
| 4,214,682 | 7/1980 | Thomas, Jr. | 222/321 |
| 5,409,146 | 4/1995 | Hazard et al. | 222/321.8 |
| 5,464,129 | 11/1995 | Ho | 222/377 |
| 5,765,605 | 6/1998 | Waymire et al. | 141/100 |
| 5,829,640 | 11/1998 | Hershey et al. | 222/153.13 |
| 5,839,474 | 11/1998 | Greaney | 137/889 |
| 5,862,948 | 1/1999 | Duchon et al. | 222/133 |

*Primary Examiner*—Kevin Shaver
*Assistant Examiner*—Thach Bui
*Attorney, Agent, or Firm*—Christie, Parker & Hale, LLP

[57] ABSTRACT

A dispensing pump coupled with a container has a pump body having an end coupled with a button cap. The button cap has a spray nozzle and a pump chamber that contains fluid to be dispensed through the spray nozzle. Inside the pump body is a plunger, a stationary tube with fingers, a biasing member, and a duckbill valve with a slit. When the plunger is in an extended position, the fingers act against the plunger to close the slit of the duckbill valve. As the button cap is depressed, the plunger translates to a depressed position thereby allowing the fingers to spread apart from the duckbill valve and open up the slit such that fluid from the container can fill up the pump chamber. The biasing member urges the plunger back to the extended position, thereby urging the opposed fingers to return to the closed position.

21 Claims, 3 Drawing Sheets

DISPENSING PUMP WITH AUTOMATIC SHUT-OFF AND METHOD OF MANUFACTURING

FIELD OF THE INVENTION

The present invention is directed to a pump that dispenses liquid from an input to an output port through a duckbill type valve and, more particularly, to a pump that may be attached to the top of a bottle for containing for the fluid.

BACKGROUND OF THE INVENTION

It is known that liquid dispensing pumps, when turned upside down or laid on a side during storage or shipping, have a tendency to leak out from the bottle. It is desired to have a dispensing pump that stops siphoning of liquid out from a container when the container is not in an upright position.

One such pump, a dispensing pump with positive shut off of a valve, such as a "duckbill" valve, is known. A duckbill valve is a hollow, elastomeric, one-way inlet valve with a ring-like base and inwardly tapering sidewalls terminating in a tip provided with a normally closed slit passage. The duckbill valve is used for controlling flow into and from a pump chamber because these valves operate reliably and are relatively inexpensive.

The disadvantage of such construction is that the user needs to depress a dispensing head of the pump and, while holding the dispensing head down, rotate the dispensing head with respect to an attached bottle to engage a threaded connection to close the duckbill valve. If the user desires to close the pump, but does not want nor need to discharge product therefrom, there is no method for doing so. In depressing the dispensing head, the product in the pump chamber of the pump bottle is discharged regardless. Accordingly, it is desired to have a dispensing pump where the duckbill valve may be shut-off without first dispensing the liquid from the bottle and without the need to depress and lock the head.

Another disadvantage is the cost of manufacturing this pump. Both an external and an internal thread formation is provided within the pump body to effect the twisting down of the cap and closing of the duckbill valve. These threaded formations are difficult to mold and increase the costs associated with the manufacturing of the pump dispenser. Further, there are critical tolerances in manufacturing pump sprays in order to have the parts work properly together. In this design, where there are a number of parts required, there is an increased cost for the parts and of manufacturing these parts with the required tolerances. As a result, the prior art pump is not economical to manufacture. An economically manufactured pump having less critical parts is therefore desired.

SUMMARY OF THE INVENTION

It is desired to provide a cost effective, manufacturable dispensing pump that has a shut-off valve that does not need to be positively operated.

The dispensing pump according to one embodiment of the invention has a pump body having an end coupled with a button cap. The button cap has a spray nozzle and a pump chamber that contains fluid to be dispensed through the spray nozzle. Inside the pump body is a plunger, a stationary tube with fingers, a biasing member, and a duckbill valve with a slit. When the plunger is in an extended position, the fingers act against the plunger to close the slit of the duckbill valve. As the button cap is depressed, the plunger translates to a depressed position thereby allowing the fingers to spread apart from the duckbill valve and open up the slit such that fluid from a container can fill up the pump chamber. The biasing member urges the plunger back to the extended position, thereby urging the opposed fingers to return to the closed position.

The present invention requires a minimum of parts, in particular, only one duckbill valve is required. The limited number of parts reduces the costs to manufacture the dispensing pump and makes the pump easier to assemble. Also, the button cap does not need to be pushed down and threaded in order to close the duckbill valve, and additional costly threaded formations in the pump body are not required.

Many of the attendant features of this invention will be more readily appreciated as the same becomes better understood by reference to the following detailed description and considered in connection with the accompanying drawings in which like reference symbols designate like parts throughout.

DETAILED DESCRIPTION OF THE INVENTION

Figure 1:
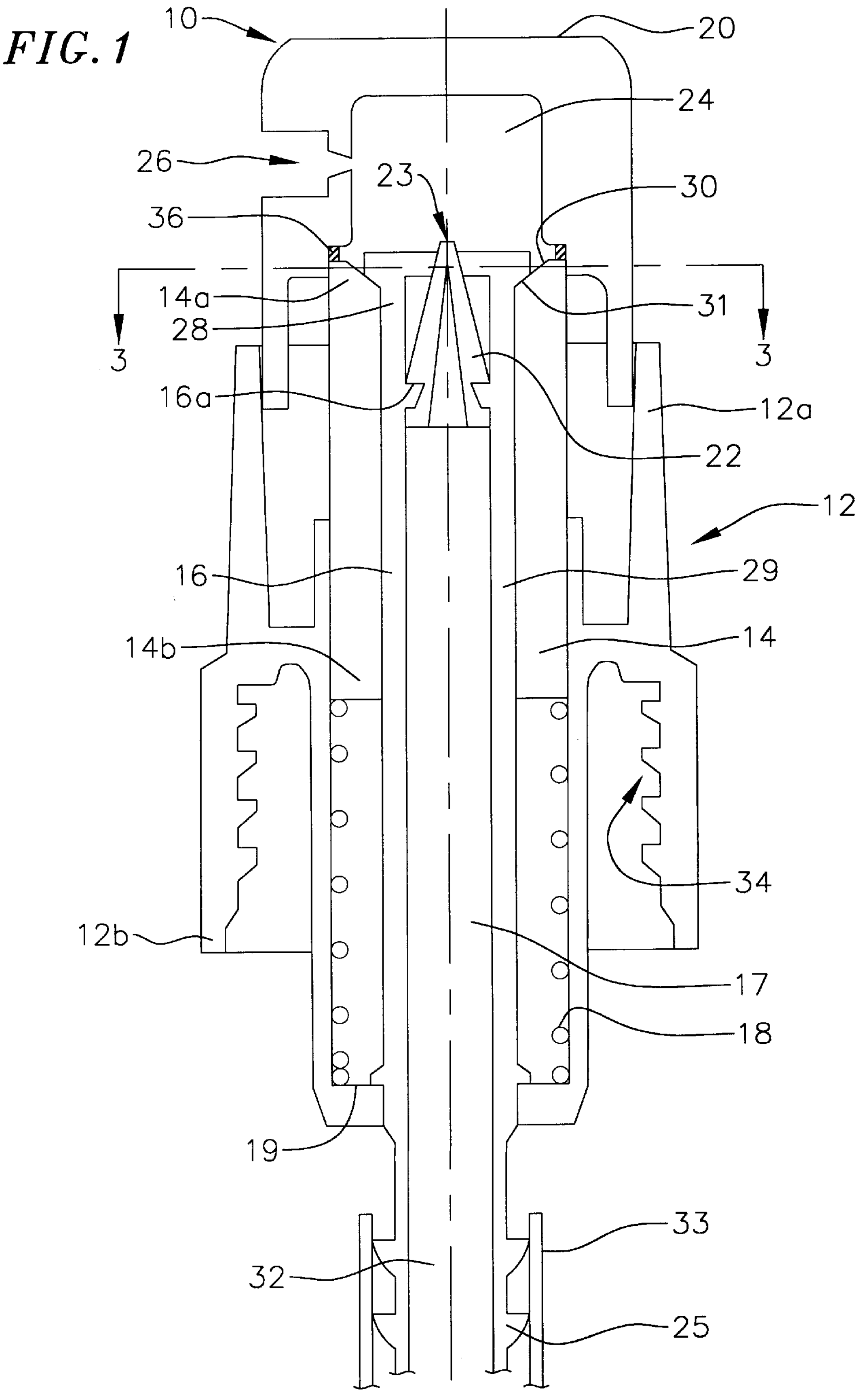
FIG. 1 is a dispensing pump in an extended position according to the present invention.
Figure 2:
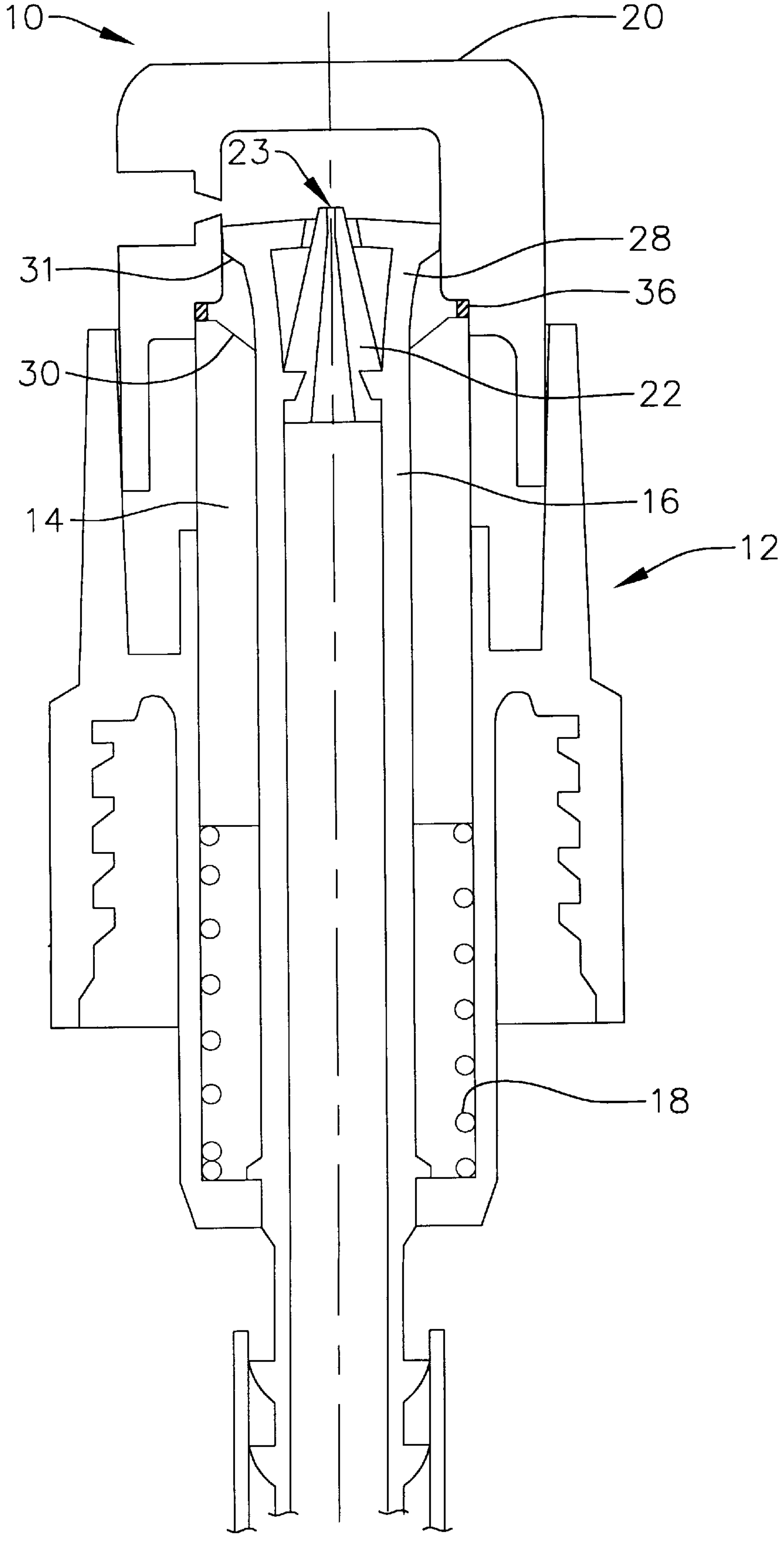
FIG. 2 is a dispensing pump in a depressed position according to the present invention.
Figure 3:
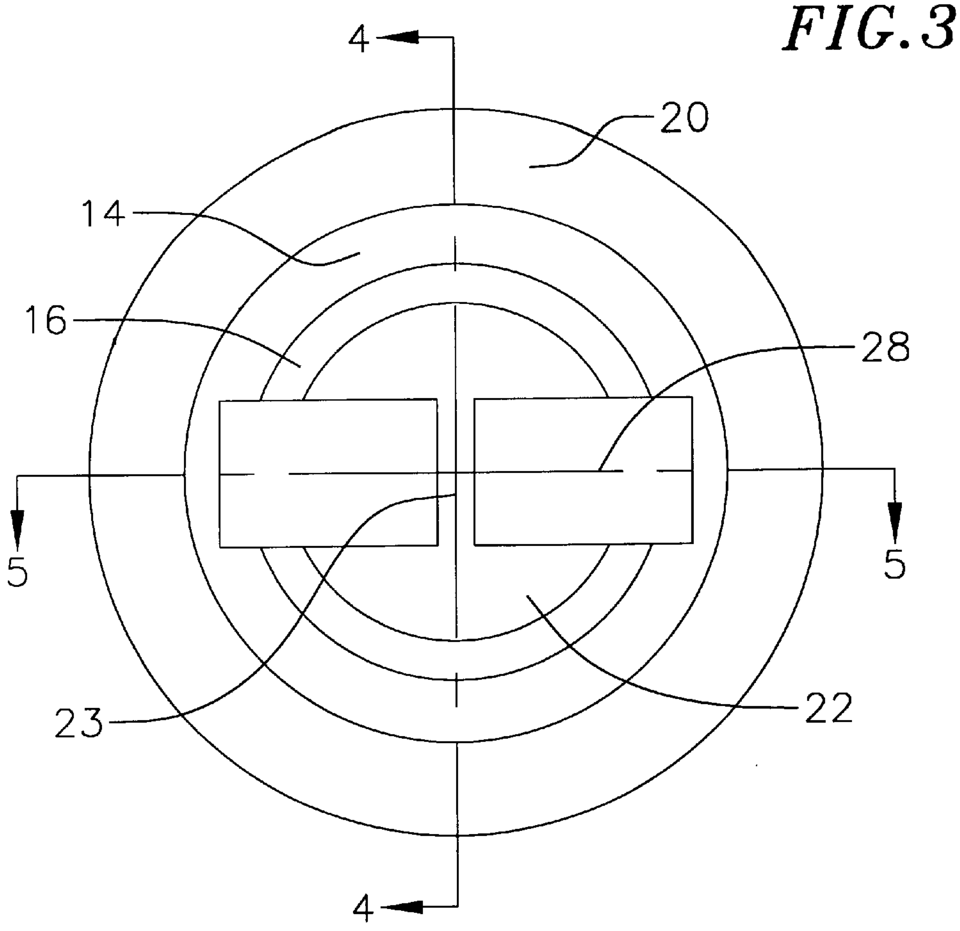
FIG. 3 is section 3—3 through FIG. 1.

Refer now to FIGS. 1–3. A dispensing pump 10 closes automatically when in a resting or extended position such that liquid siphoning out of the pump is limited or restricted. The dispensing pump 10 has a pump body 12 with a first end 12*a* and a second end 12*b*, and a button cap 20 coupled with the first end 12*a*. The button cap 20 has a spray nozzle 26 and a pump chamber 24 that contains fluid to be dispensed out the spray nozzle 26. Interior threads 34 on the pump body 12 are capable of coupling the pump body 12 to external threads on a bottle containing the product to be dispensed.

Enclosed within the pump body 12 is a plunger 14 that moves between an extended position (FIG. 1) and a depressed position (FIG. 2). A biasing member 18, such as a spring, is coupled to and extends between a second end 14*b* of the plunger 14 and an end wall 19 of the pump body 12. A stationary tube 16 having a passage 17 around a central axis is encompassed within the plunger 14. A duckbill valve 22 is provided in the passage 17 of the stationary tube 16 at the first end 12*a* of the pump body 12.

The pump seals against leakage without the need to screw the button cap down or have some equivalent action, through a seal 36 between the button cap 20 and the pump body 12. This seal is beneficial in preventing leakage in shipping, handling and storing the product. Preferably, the seal 36 is an annular seal, more particular an O-ring, because they are economical to use in this assembly. As shown in FIG. 1, the seal 36 is force fit into the gap between a seat on a first end 14*a* of the plunger 14 and a bottom side of the button cap 20. The upward pressure from the biasing member 18 insures the seal is maintained.

A flexible plastic straw 33 extends into the fluid container or bottle coupled to the dispensing pump 10. A fluid inlet 32 extends through the flexible plastic straw 33, through passage 17 along the length of the pump body 12 to duckbill valve 22. Barbs or a bee stinger 25 extends from the second end 12*a* of the pump body from corresponding passage 17 along fluid inlet 32. Preferably, the bee stinger 25 is integrally coupled with the stationary tube 16 and is used to secure the straw 33 to the dispensing pump 10. This bee stinger 25 has several edges that come into contact with interior walls of the straw 33 to frictionally engage the straw to the pump body. Preferably, a vacuum seal is created in the spaces between the straw 33 and the bee stinger 25.

The stationary tube 16 has a main portion 29 coupled with the second end 12*b* of the pump body 12 and has opposing fingers 28 with a backside 31 that corresponds with the first end 14*a* of the plunger 14. The opposing fingers 28 are comprised of a stiff plastic, and have a spring like quality. Preferably, the fingers are made of Celcon (Celcon is a trademark of Hoechst Celanese) or Delrin (Delrin is a trademark of Du Pont). When in the closed position, the flexible and resilient opposing fingers are preferably shaped substantially as an inverted "U," where inside the U-shape is the duckbill valve 22. Individually, the fingers are substantially L-shaped. The two "L"s come together to pinch closed a slit 23 in the top of the duckbill valve 22.

The plunger 14 further has a cam surface 30 at the first end 14*a* which is sloped down toward the center of the pump body 12 from the seat for the seal 36. When in the extended position, the backside 31 of the L-shaped fingers 28 rest against a portion of the cam surface 30 and are forced together into the closed position by the interior surface of the plunger 14.

The biasing member 18 urges the plunger 14 to the extended position toward the first end 12*a* of the pump body 12, thereby urging the opposed fingers 28 to the closed position. As a result, the slit 23 of the duckbill valve 22 automatically closes when the device is in an extended position, such that the user will not have to remember or make any additional actions in order to close off the duckbill valve 22.

When the user presses the button cap 20 down toward the second end 12*b* of the pump body 12, the pump dispenser is activated. The fluid in the pump chamber 24 compresses and is forced out the spray nozzle 26. The seal 36 which is coupled with the button cap 20 presses down with the button cap 20 into the plunger 14. Then the plunger 14 translates toward the second end 12*b* of the pump body 12 into the depressed position, thereby compressing the biasing member 18. The volume of the pump chamber 24 remains at a minimum while the plunger is in this depressed position.

As the plunger 14 translates, the cam surface 30 and the interior surface of the plunger slide down along the opposing fingers 28 thereby releasing the fingers from the force holding them together. The resilience of the opposing fingers springs them apart as they return to an original shape. The movement of the plunger 14 only affects the fingers 28 of the stationary tube 16, the main portion 29 of the stationary tube does not translate or pivot when the plunger 14 moves.

Figure 4:
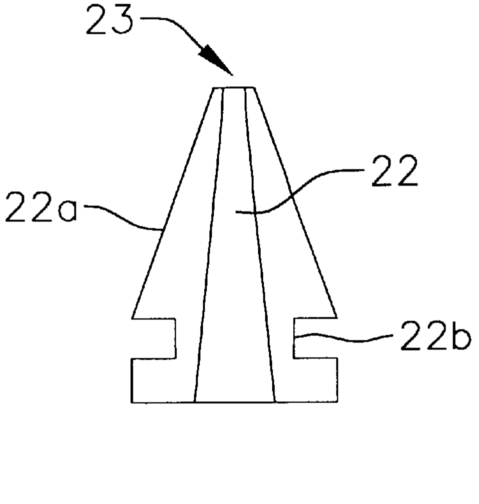
FIG. 4 is a cross-sectional view of a duckbill valve in a first direction according to the preferred embodiment.
Figure 5:
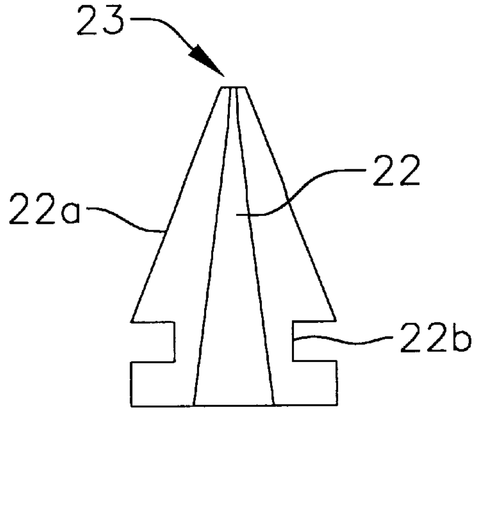
FIG. 5 is a cross-sectional view of a duckbill valve in a second direction according to the preferred embodiment.

FIGS. 4 and 5 are cross-sectional views of the duckbill valve 22 according to a preferred embodiment. The views show the width of the slot 23 that varies with the orientation of the duckbill valve 22. Tapering sidewalls 22*a* of the duckbill valve 22, along with an undercut 22*b*, allows the duckbill valve to be securely installed into the pump dispenser 10. The duckbill valve 22 slides tapered side first up through passage 17. The duckbill valve slides past ledge 16*a* of the stationary tube 16 until the ledge 16*a* occupies the cutout space remaining from the undercut 22*b*. In this configuration, the duckbill valve 22 is unable to manuever from this operable position unintentionally.

The duckbill valve 22 is preferably a soft thermoplastic elastomer. The valve 22 is flexible, and soft so that it is capable of being closed by the fingers, resilient enough to be capable to return to its original shape and open the slit 23 when the opposing fingers are in the open position, and resistant to most chemical products that will be contained in the pump bottles. More preferably, the duckbill valve 22 comprises low density polyethylene (LDPE), but can also comprise polyurethane.

The pump discharges fluids such as poisonous sprays, and insecticides, in the range of from a fine mist spray to a slow moving flow. In an alternative embodiment, the LDPE used for the duckbill valve can have an additive, agent or slip that will keep the duckbill valve from sticking together due to the fluids utilized.

Because the duckbill valve 22 is made of a resilient and flexible material, when the fingers are no longer resting against the cam surface 30, the duckbill valve 22 fills out to an original shape thereby assisting in spreading the opposing fingers apart into an open position. The slit 23 of the duckbill valve 22 is thereby opened up to allow for the passage of fluid from the fluid inlet 32 to the pump chamber 24 and out the spray nozzle 26.

The plunger 14 is urged to the extended position by the biasing member 18. When the user releases the pressure on the button cap 20, the plunger 14 moves from the depressed position back to the extended position. As the plunger translates, the expanding pump chamber 24 acts as a vacuum to suck the fluid from the fluid inlet 32 to the container through the slit 23 until the duckbill valve 22 is closed again by the fingers 28. As the plunger extends, the fingers 28 slide down the cam surface 30 and move into the closed position. The pump chamber 24 is then filled with the liquid ready to be dispensed, and the container is sealed from leaking excess fluid into the pump chamber 24.

The pump body including the plunger and the stationary tube is made of molded plastic. Preferably, the plunger comprises polyethelene, Celcon, or Delrin. Polyethylene is used for the benefit of preventing the elements from sticking together from the liquid contained therein, and it is economical to use.

Preferably, the cam surface 30 is made of Celcon or Delrin. Alternatively, the cam surface can be made of polyethylene or nylon, as long as the surface is substantially frictionless so the fingers can slide along the cam surface as the plunger moves with respect to the fingers. Preferably, the cam surface has memory after molding, in particular, the cam surface returns to its original shape when pressure is released from the surface.

Although this invention has been described in certain specific embodiment, many additional modifications and variations will be apparent to those skilled in the art. It is therefore to be understood that this invention may be practiced otherwise and as specifically described. For example, the dispensing pump with the automatic shut-off need not be used with a finger pump. Any pump spray, such as a hand held pump or a trigger spray, may incorporate the present invention. Thus, the present embodiments of the invention should be considered in all respects as illustrated and not restrictive, the scope of the invention to be indicated by the appended claims rather than the foregoing description.

What is claimed is:

1. A pump dispenser having a fluid inlet comprising:

a pump body having an end;

a button cap having a spray nozzle and coupled with the end of the pump body;

a plunger located inside the pump body, and having a cam surface, the plunger being movable between a depressed position when the button cap is depressed and an extended position;

a stationary tube located inside the plunger and having opposed fingers, the opposed fingers having a closed position due to pressure by the plunger in the extended position and an open position when the plunger is in the depressed position;

a biasing member urging the plunger to the extended position, thereby urging the opposed fingers to the closed position; and a duckbill valve for receipt of fluid from the fluid inlet and located between the opposed fingers of the stationary tube, the opposed fingers, when in the closed position, closing the duckbill valve.

2. The pump dispenser of claim 1 wherein the pump dispenser is for use with a trigger spray.

3. The pump dispenser of claim 1 wherein the pump dispenser is for use with a finger pump spray.

4. The pump dispenser of claim 1 wherein the biasing member is a spring.

5. The pump dispenser of claim 1 further comprising a seal between the button cap and the pump body, wherein the seal is an O-ring.

6. The pump dispenser of claim 1 wherein the opposing fingers together form an inverted U-shape.

7. The pump dispenser of claim 1 wherein the pump body including the plunger and the stationary tube are made of a molded plastic that prevents the elements from sticking together from the liquid contained therein.

8. The pump dispenser of claim 7 wherein the pump body is made of polyethylene.

9. The pump dispenser of claim 1 wherein the duckbill valve in an original shape is capable of being closed by the opposing fingers, and of being opened to return to the original shape.

10. The pump dispenser of claim 1 wherein the duckbill valve comprises thermoplastic elastomer.

11. The pump dispenser of claim 1 wherein the duckbill valve comprises one of low density polyethylene (LDPE) and polyurethane.

12. The pump dispenser of claim 1 wherein the fingers are made of a stiff plastic that has a spring like quality.

13. The pump dispenser of claim 1 wherein the fingers comprise one of Celcon and Delrin.

14. The pump dispenser of claim 1 wherein the cam surface is substantially frictionless so the opposing fingers are capable of sliding along the cam surface as the plunger moves with respect to the opposing fingers.

15. The pump dispenser of claim 1 wherein the cam surface comprises one of Celcon, Delrin, polyethylene and nylon.

16. A bottle with a pump dispenser having a fluid inlet in the bottle, the pump dispenser comprising:

a pump body having an end;

a button cap having a spray nozzle and coupled with the end of the pump body;

a plunger located inside the pump body, and having a cam surface, the plunger being movable between a depressed position when the button cap is depressed and an extended position;

a stationary tube located inside the plunger and having opposed fingers, the opposed fingers having a closed position due to pressure by the plunger in the extended position and an open position when the plunger is in the depressed position;

a biasing member urging the plunger to the extended position, thereby urging the opposed fingers to the closed position; and a duckbill valve for receipt of fluid from the fluid inlet and located between the opposed fingers of the stationary tube, the opposed fingers, when in the closed position, closing the duckbill valve.

17. The pump dispenser of claim 16 wherein the duckbill valve is capable of being resistant to chemical products contained in the pump bottles.

18. A method of assembling a dispensing pump with an automatic shut off and a button cap comprising:

molding a pump body having a first end adjacent the button cap, and a second end opposite the first end, and a passage along a central axis of the pump body; and inserting a duckbill valve into the passage from the direction of the second end.

19. The method of claim 18 further comprising causing a ledge in the passage to engage an undercut of the duckbill valve.

20. The method of claim 18 further comprising providing a ring on an inside surface of the passage, wherein the ring has an inner diameter that decreases in a direction toward the first end; providing a groove around an exterior of the duckbill valve; and moving the duckbill valve through the ring until the ring extends into the groove.

21. The pump dispenser of claim 1 further comprising a ring on an inside surface of the stationary tube, wherein the ring has an inner diameter that decreases in a direction toward the opposed fingers; and a groove around a perimeter of the duckbill valve into which the ring extends.

* * * * *